United States Patent
Mesmakhosroshahi et al.

(10) Patent No.: US 10,282,589 B2
(45) Date of Patent: May 7, 2019

(54) METHOD AND SYSTEM FOR DETECTION AND CLASSIFICATION OF CELLS USING CONVOLUTIONAL NEURAL NETWORKS

(71) Applicant: KONICA MINOLTA LABORATORY U.S.A., INC., San Mateo, CA (US)

(72) Inventors: Maral Mesmakhosroshahi, Foster City, CA (US); Shubham Agarwal, Belmont, CA (US); Yongmian Zhang, Union City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 106 days.

(21) Appl. No.: 15/690,037

(22) Filed: Aug. 29, 2017

(65) Prior Publication Data

US 2019/0065817 A1    Feb. 28, 2019

(51) Int. Cl.
*G06K 9/00* (2006.01)
*G06K 9/62* (2006.01)

(52) U.S. Cl.
CPC ........ *G06K 9/0014* (2013.01); *G06K 9/00147* (2013.01); *G06K 9/6257* (2013.01); *G06K 9/6263* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 9,430,829 B2* | 8/2016 | Madabhushi | ...... G06K 9/00147 |
| 9,436,895 B1* | 9/2016 | Jones | ...... G06N 3/0454 |

(Continued)

FOREIGN PATENT DOCUMENTS

| | | |
|---|---|---|
| WO | 2016/119076 A1 | 8/2016 |
| WO | 2017/015390 A1 | 1/2017 |

OTHER PUBLICATIONS

Sirinukunwattana et al., "Locality Sensitive Deep Learning for Detection and Classification of Nuclei in Routine Colon Cancer Histology Images", IEEE Transactions on Medical Imaging, vol. 35, No. 5, pp. 1196-1206, May 2016.

(Continued)

*Primary Examiner* — Anand P Bhatnagar
(74) *Attorney, Agent, or Firm* — Chen Yoshimura LLP

(57) ABSTRACT

An artificial neural network system implemented on a computer for cell segmentation and classification of biological images. It includes a deep convolutional neural network as a feature extraction network, a first branch network connected to the feature extraction network to perform cell segmentation, and a second branch network connected to the feature extraction network to perform cell classification using the cell segmentation map generated by the first branch network. The feature extraction network is a modified VGG network where each convolutional layer uses multiple kernels of different sizes. The second branch network takes feature maps from two levels of the feature extraction network, and has multiple fully connected layers to independently process multiple cropped patches of the feature maps, the cropped patches being located at a centered and multiple shifted positions relative to the cell being classified; a voting method is used to determine the final cell classification.

12 Claims, 4 Drawing Sheets

(56) References Cited

U.S. PATENT DOCUMENTS

| | | | |
|---|---|---|---|
| 10,049,450 B2* | 8/2018 | Madabhushi | G06T 7/0012 |
| 10,089,556 B1* | 10/2018 | Xu | G06K 9/00771 |
| 2015/0170002 A1 | 6/2015 | Szegedy et al. | |
| 2015/0213302 A1* | 7/2015 | Madabhushi | G06K 9/00147 |
| | | | 382/133 |
| 2017/0124415 A1* | 5/2017 | Choi | G06N 3/08 |
| 2018/0130203 A1* | 5/2018 | Abedini | G06T 7/0012 |
| 2018/0137338 A1* | 5/2018 | Kraus | G06K 9/6259 |
| 2018/0150684 A1* | 5/2018 | Wang | G06T 7/11 |
| 2018/0157962 A1* | 6/2018 | Henry | G06N 3/063 |
| 2018/0260665 A1* | 9/2018 | Zhang | G06K 9/6276 |
| 2018/0322327 A1* | 11/2018 | Smith | G06K 9/00147 |
| 2018/0322631 A1* | 11/2018 | Madabhushi | G06T 7/0012 |
| 2018/0336672 A1* | 11/2018 | Perticone | G06T 7/0002 |
| 2018/0350063 A1* | 12/2018 | Nakano | G06T 7/0012 |

OTHER PUBLICATIONS

Gao et al., "HEp-2 Cell Image Classification with Deep Convolutional Neural Networks", IEEE Journal of Biomedical and Health Informatics, vol. 21, No. 2, pp. 416-428, Mar. 2017.

Spanhol et al., "Breast Cancer Histopathological Image Classification using Convolutional Neural Networks", International Joint Conference on Neural Networks , pp. 2560-2567, 2016.

Simonyan et al., "Very Deep Convolutional Networks for Large-Scale Image Recognition", arXiv preprint arXiv:1409.1556v6, 2015.

\* cited by examiner

METHOD AND SYSTEM FOR DETECTION AND CLASSIFICATION OF CELLS USING CONVOLUTIONAL NEURAL NETWORKS

BACKGROUND OF THE INVENTION

Field of the Invention

This invention relates to artificial neural network technology, and in particular, it relates to a convolutional neural network (CNN) for processing biological images for cell segmentation and cell classification.

Description of Related Art

Artificial neural networks are used in various fields such as machine leaning, and can perform a wide range of tasks such as computer vision, speech recognition, etc. An artificial neural network is formed of interconnected layers of nodes (neurons), where each neuron has an activation function which converts the weighted input from other neurons connected with it into its output (activation). In a learning (training) process, training data are fed into to the artificial neural network and the adaptive weights of the interconnections are updated through the leaning process. After learning, data can be inputted to the network to generate results (referred to as prediction).

A convolutional neural network (CNN) is a type of feed-forward artificial neural network; it is useful particularly in image recognition. Inspired by the structure of the animal visual cortex, a characteristic of CNNs is that each neuron in a convolutional layer is only connected to a relatively small number of neurons of the previous layer. A CNN typically includes one or more convolutional layers, pooling layers, ReLU (Rectified Linear Unit) layers, fully connected layers, and loss layers. In a convolutional layer, the core building block of CNNs, each neuron computes a dot product of a 3D filter (also referred to as a kernel) with a small region of neurons of the previous layer (referred to as the receptive field); in other words, the filter is convolved across the previous layer to generate an activation map (also referred to as a feature map). This contributes to the translational invariance of CNNs. In addition to a height and a width, each convolutional layer has a depth, corresponding to the number of filters in the layer, each filter producing an activation map (referred to as a slice of the convolutional layer). A pooling layer performs pooling, a form of downsampling, by pooling a group of neurons of the previous layer into one neuron of the pooling layer. A widely used pooling method is max pooling, i.e. taking the maximum value of each input group of neurons as the pooled value; another pooling method is average pooling, i.e. taking the average of each input group of neurons as the pooled value. The general characteristics, architecture, configuration, training methods, etc. of CNNs are well described in the literature. Various specific CNNs models have been described as well.

Finding different types of cells in biological images is an important step in cancer analysis and can result in better treatment. Conventionally, classifying cells into different types is a very challenging task which usually needs to be done by an expert and is time consuming. With recent developments in computer vision and machine learning, deep learning based approaches have been proposed that can perform cell classification automatically which is more efficient. Classifying cells into different types is usually a two-step process that includes cell segmentation and cell classification. Cell segmentation tries to find an accurate boundary for each cell in the biological image. Cell segmentation can be more difficult compared to segmentation of natural scene images due to large variations in cell types, unclear boundaries and occlusion. Cell classification classifies each of the segmented cells to one of a number of predefined cell types. The main challenge in cell classification is to train an artificial neural network to be able to correctly classify the cells that are visually similar but belong to different types.

Various deep learning systems for cell segmentation and classification have been described. For example, K. Sirinukunwattana et al., "Locality Sensitive Deep Learning for Detection and Classification of Nuclei in Routine Colon Cancer Histology Images", IEEE Transactions on Medical Imaging, pp. 1196-1206, February 2016, describes a cell segmentation and classification system using two different neural networks for segmentation and classification, respectively. Z. Gaoa et al., "HEp-2 Cell Image Classification with Deep Convolutional Neural Networks", IEEE Journal of Biomedical and Health Informatics, pp. 416-428, March 2017, describes cell classification using LeNet-5, which has 2 convolutional layers and 2 pooling layers. F. A. Spanhol et al., "Breast Cancer Histopathological Image Classification using Convolutional Neural Networks", IJCNN, 2016, also describes a convolutional network for cell classification. The method extracts several patches randomly or based on a grid search and feeds them to the CNN.

SUMMARY

Conventional machine learning methods for cell classification mostly rely only on a shape feature and may lack sufficient differentiation when the cell shape is not well extracted. Also they rely on the features in a single image patch, which may fail in some cases when the cell center is not accurately determined due to segmentation errors. To solve this problem, embodiments of the present invention provide a deep convolutional neural network which is able to capture multi-level features and a diverse set of discriminative appearance factors of individual cell classes by performing supervised learning of neighboring regions' classes on multi-level feature maps.

An object of the present invention is to provide more accurate cell segmentation and classification in biological images.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides an artificial neural network system implemented on a computer for cell segmentation and classification in biological images, which includes: a convolutional neural network, including a plurality of convolutional layers and a plurality of pooling layers connected in series, configured to receive an input image patch and generate feature maps at each of the plurality of convolutional layers and pooling layers; a first branch network, including at least one convolutional layer, configured to receive feature maps generated by a final pooling layer of the convolutional neural network and generate a cell segmentation map for the input image patch, the cell segmentation map being a binary map including a plurality of cell body regions corresponding to cells within the input image patch; and a second branch network, including N fully connected layers in parallel, N being equal to or greater than 1, the second branch network being configured to receive feature maps from the convolutional neural network and receive the cell segmentation map generated by the first branch network, and to calculate a classification for each of the cell body regions in the cell segmentation map.

In some embodiments, each convolution layer in the convolutional neural network performs a plurality of convolutional operations on a previous convolutional layer using a plurality of kernels of different predefined sizes.

In some embodiments, the first branch network includes: a 1×1 convolutional layer configured to receive the feature maps generated by a final pooling layer of the convolutional neural network; a softmax layer configured to receive output of the 1×1 convolutional layer and calculate a probability map which represents probabilities of each pixel of the input image patch being one of three classes including cell body, cell boundary, and background; and a post-processing module configured to receive the probability map and generate the cell segmentation map.

In some embodiments, the second branch network is configured to receive feature maps from a final pooling layer and at least one intermediate pooling layer of the convolutional neural network.

In some embodiments, the second branch network further includes: a feature map merging layer configured to receive final feature maps from the final pooling layer of the convolutional neural network and intermediate feature maps from an intermediate pooling layer of the convolutional neural network, and combine them into combined feature maps; a cropping layer configured to crop N feature map patches from the combined feature maps based on the cell segmentation map, the N feature map patches corresponding to a cell body region of the cell segmentation map; wherein each of the N fully connected layers operate on a corresponding one of the N feature map patches; and wherein the second branch network further comprises N softmax layers each configured to receive output of a corresponding one of the N fully connected layers and calculate a probability vector representing probabilities of the corresponding feature map patch belonging to each of a plurality of predefined cell classes.

In some embodiments, N is greater than 1, wherein the N feature map patches cropped by the cropping layer includes one feature map patch centered on the cell body region of the cell segmentation map and N-1 feature map patches shifted in their positions in different directions with respect to a center of the cell body region, and wherein the N fully connected layers and the corresponding N softmax layers independently operate on the N feature map patches.

In some embodiments, the second branch network further comprises a voting module configured to determine the classification for the cell body region based on the N probability vectors calculated by the N softmax layers.

In another aspect, the present invention provides a method for training the above-described artificial neural network, the method including: (a) providing first stage training data which comprises first training image patches containing cells and corresponding first cell segmentation label data; (b) training the convolutional neural network and the at least one convolutional layer of the first branch network using the first stage training data, by feeding the first training image patches to the convolutional neural network and calculating a loss of output of the convolutional layer of the first branch network using the first cell segmentation label data; (c) providing second stage training data which comprises second training image patches containing different types of cells, corresponding second cell segmentation label data, and corresponding cell type label data; and (d) after step (b), while keeping the trained convolutional neural network unchanged, training each of the N fully connected layers of the second branch network independently using the second stage training data, by feeding the second training image patches to the convolutional neural network, feeding the second cell segmentation label data to the second branch network, and calculating a loss of output of the fully connected layer using the cell type label data.

In another aspect, the present invention provides a computer program product comprising a computer usable non-transitory medium (e.g. memory or storage device) having a computer readable program code embedded therein for controlling a data processing apparatus, the computer readable program code configured to implement the above-described artificial neural network and its training method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
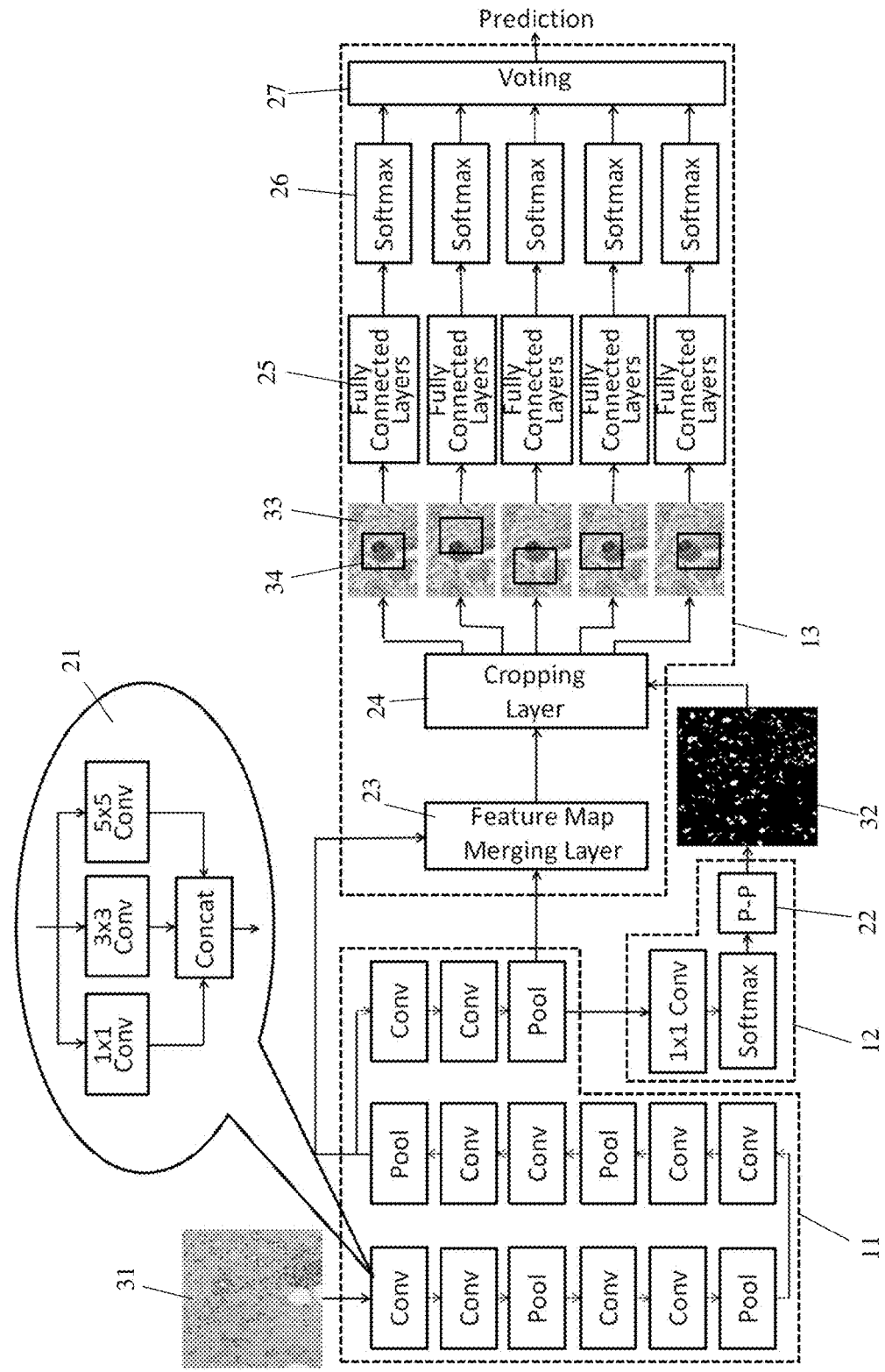
FIG. 1 schematically illustrates the architecture of an artificial neural network system for both cell segmentation and cell classification of biological images according to an embodiment of the present invention.

FIG. 1 schematically illustrates the architecture of an artificial neural network system for both cell segmentation and cell classification of biological images. The network system is a unified network with two branches for cell segmentation and classification, so that segmentation and classification share weights in feature extraction.

The system includes a feature extraction network 11, which is common to the segmentation and classification structures; it further includes a first branch network 12 which performs cell segmentation, and a second branch network 13 which performs cell classification. Both the first branch network 12 and the second branch network 13 take data from the feature extraction network 11 as input; the second branch network 13 also takes the output of the first branch network 12—the segmented image, also referred to as the segmentation map—as input.

The feature extraction network 11 is a deep convolutional neural network. In one embodiment, the feature extraction network 11 is based on a modified VGG network, which can extract richer features. VGG networks are deep convolutional neural networks well known in the art, and described in detail in K. Simonyan et al., Very Deep Convolutional Networks For Large-Scale Image Recognition, arXiv preprint arXiv:1409.1556, 2015 ("Simonyan et al. 2015"). The feature extraction network 11 includes a number of (five in the illustrated example) groups of convolutional layers in series, each group including a number of (two in the illustrate example) convolutional layers, with a pooling layer (e.g. max pooling) after each group of convolutional layers.

The original VGG network described in Simonyan et al. 2015 is modified as follows. In the original VGG network, each convolutional layer uses a single kernel of a predefined size to perform the convolution. In embodiments of the present invention, each convolutional layer 21 of the modified VGG network performs multiple convolutional operations using kernels of different predefined sizes. In the illustrated embodiment, three kernels are used to perform three convolutions, the kernel sizes being 1×1, 3×3 and 5×5, respectively. Thus, each slice in the previous layer generates multiple (three in this example) slices in the next convolutional layer by the convolutional operations. In FIG. 1, the box labeled "concat" schematically indicates that multiple slices resulting from the multiple convolutions are arranged together in the next layer. One advantage for using multiple kernels of different kernel sizes is that the network 11 can extract both local features using smaller convolutions and more highly abstracted features using larger convolutions. This gives richer feature maps which help both segmentation and classification.

The input into the feature extraction network 11 is an image patch 31. The final output of the feature extraction network 11, i.e. the feature maps from the final pooling layer of the modified VGG network, is inputted into the first branch network 12 for cell segmentation. In one embodiment, the first branch network 12 includes a 1×1 convolutional layer followed by a softmax layer. The 1×1 convolutional layer uses a predetermined number (e.g. 24, 48, etc.) of independent 1×1 convolutional kernels. The softmax layer calculates the probabilities of each pixel of the input image patch being one of three classes: cell body, cell boundary (boundary between cell body and background), and background. The calculated probabilities may be represented as a three-channel probability map, each channel (a 2-dimensional map) representing the probabilities of the pixels being one of the three classes.

Figure 4:
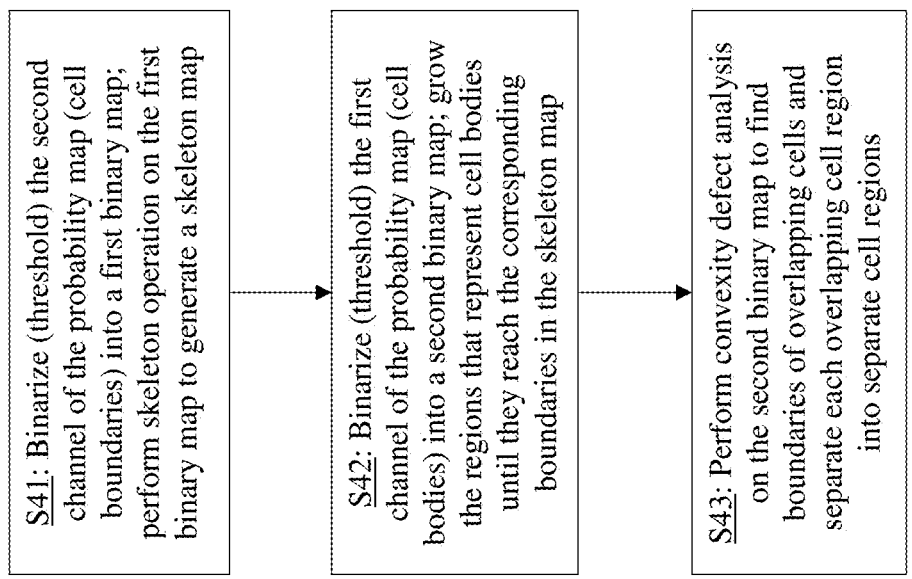
FIG. 4 schematically illustrates a post-processing method for cell segmentation according to an embodiment of the present invention.

The first branch network also includes a post-processing module 22 which performs post-processing on the probability map generated by the softmax layer to correct the boundaries and locate the cell bodies more accurately. As shown in FIG. 4, the post-processing method includes three steps. The second channel of the probability map, which represents the cell boundary probabilities, is binarized (e.g. using a threshold value) into a binary map, and a skeleton operation is performed on the binary map to generate a skeleton map (step S41). Skeleton is a binary operation that generates approximately 1-pixel wide lines or "skeleton" of a binary map. This skeleton map represents the thin lines that are the cell boundaries. The first channel of the probability map, which represents the cell body probabilities, is binarized into another binary map, and the cell body regions of this cell body binary map are grown until they reach the positions of the surrounding thin boundaries in the skeleton map (step S42). Lastly, a convexity defect analysis is performed on the cell body binary map generated by step S42, to find the boundaries of overlapping cells and to separate each overlapping cell region into multiple separate cell regions (step S43). For example, if a cell body region in the cell body binary map has an "8" shape with two concave parts, it will be deemed to be two cells and be separated into two cell regions along a line that connect the two concave parts. This completes the post-processing, and the resulting cell body binary map is output as the cell segmentation map 32. The post-processing step 22 gives a more accurate mask of the cells as compared to the probability maps generated by the softmax layer.

Any suitable methods may be used to perform the various operations in the post-processing mentioned above. For example, software programs in the Open CV library may be used to perform some of these operations.

Because the whole biological image being processed is typically larger than the input image size of the feature extraction network 11, the whole image is divided into multiple image patches 31 matching the input image size of the feature extraction network 11, and the image patches 31 are separately processed by the feature extraction network 11 and the first branch network 12. The multiple cell segmentation maps 32 generated from the multiple input image patches 31 are recombined together (i.e. they are arranged side by side in the same way the whole image was divided) to form a cell segmentation map of the whole biological image (for convenience, the whole cell segmentation map is also represented by reference number 32 in FIG. 1).

The second branch network 13 performs cell classification using the feature maps produced by the series of convolutional and pooling layers of the modified VGG network 11. Cell classification includes three major steps: feature map merging, cropping of multiple feature map patches, and prediction using the multiple patches based on a voting scheme.

First, as discussed above, the whole biological image is divided into multiple input image patches 31 and processed by the feature extraction network 11 separately; a feature map merging layer 23 of the second branch network 13 merges the feature maps output by the feature extraction network 11 for the multiple image patches 31.

More specifically, the feature map merging layer 23 takes the final feature maps of the feature extraction network 11 (i.e. from the final pooling layer) generated from each input image patch 31, and recombines them together (i.e. arrange them side by side in the same way whole image was divided) to form the final feature maps of the whole image. In addition, the feature map merging layer 23 also takes feature maps from an intermediate layer of the feature extraction network 11 for each input image patch 31, and recombines them together to form intermediate feature maps of the whole image. In the illustrated embodiment, the intermediate feature maps are taken from the pooling layer after the fourth group of convolutional layers of the modified VGG network 11. The final feature maps for the whole image and the intermediate feature maps for the whole image are combined (e.g. concatenated) together to form combined feature maps for the whole image, which is used for further processing for cell classification. An advantage of using the intermediate feature maps is that, in the final layer of the modified VGG network 11, details of objects might be lost; using feature maps from one or more intermediate layers can provide richer feature maps that include more feature information.

The combined feature maps for the whole image are then used to perform cell classification for each cell identified in the cell segmentation map 32, to classify each cell to one of a number of predefined cell types. For each cell body region in the cell segmentation map 32, a cell center and a cell size, e.g. the size of its bounding box, can be determined. For each cell body region in the cell segmentation map 32, a cropping layer 24 generates multiple cropped patches from the combined feature maps. The multiple cropped patches have the same size, which is slightly larger than the cell body region, and are respectively located at a centered position and a number of slightly off-centered or shifted positions with respect to the cell center. The amounts of the shifts for the shifted positions may be a fraction of the cell size, such as one half of the cell size. In one embodiment, four shifted patches are cropped, which are respectively shifted in four perpendicular directions (right, left, up and down) from the cell center. In FIG. 1, boxes 34 schematically illustrate the centered and the four shifted positions of the cropped patches in an area 33 of the combined feature maps.

The multiple cropped patches 34 from the combined feature maps are fed into multiple (five in the illustrated example) separate fully connected layers 25 respectively followed by multiple (five in the illustrated example) softmax layers 26 to perform prediction. The output of each softmax layer 26 is a vector representing the probabilities of the corresponding cropped patch 34 (hence the corresponding cell body region of the segmentation map) belonging to each of a number of predefined cell classes, and the class with the highest score is taken as the classification result for the corresponding cropped patches 34. A voting module 27 is then used on the multiple classification results, and the classification that has a majority among the multiple classification result is deemed the final classification result, i.e. the cell class that the cell belongs to ("prediction" in FIG. 1). If there is no majority in the voting, the classification with the highest vote among the multiple classification results is deemed the final classification result.

An advantage of using multiple cropped patches and processing them independently in cell classification is that, because of possible cell segmentation errors, the cell segmentation map may not accurately detect the center of each cell. By using multiple patches with shifted locations relative to the cell center, features of the cell may be more completely captured from the feature maps and more accurate classification may be achieved.

It should be noted that although in the above described embodiment the feature maps of image patches resulting from dividing the whole biological image are recombined together for cell classification, such recombination is not necessary. Cell segmentation and cell classification can be applied to each image patch individually without recombining them, to classify the cells contained in each image patch. In such a situation, the feature map merging layer 23 only merges feature maps from different layers of the feature extraction network 11, and does not perform the function of recombining feature maps for different image patches. Processing image patches individually may cause the problem that cells that are cut off by the edge of the image patch may not be correctly classified, but this problem can be addressed by forming image patches that slightly overlap each other.

Figure 2:
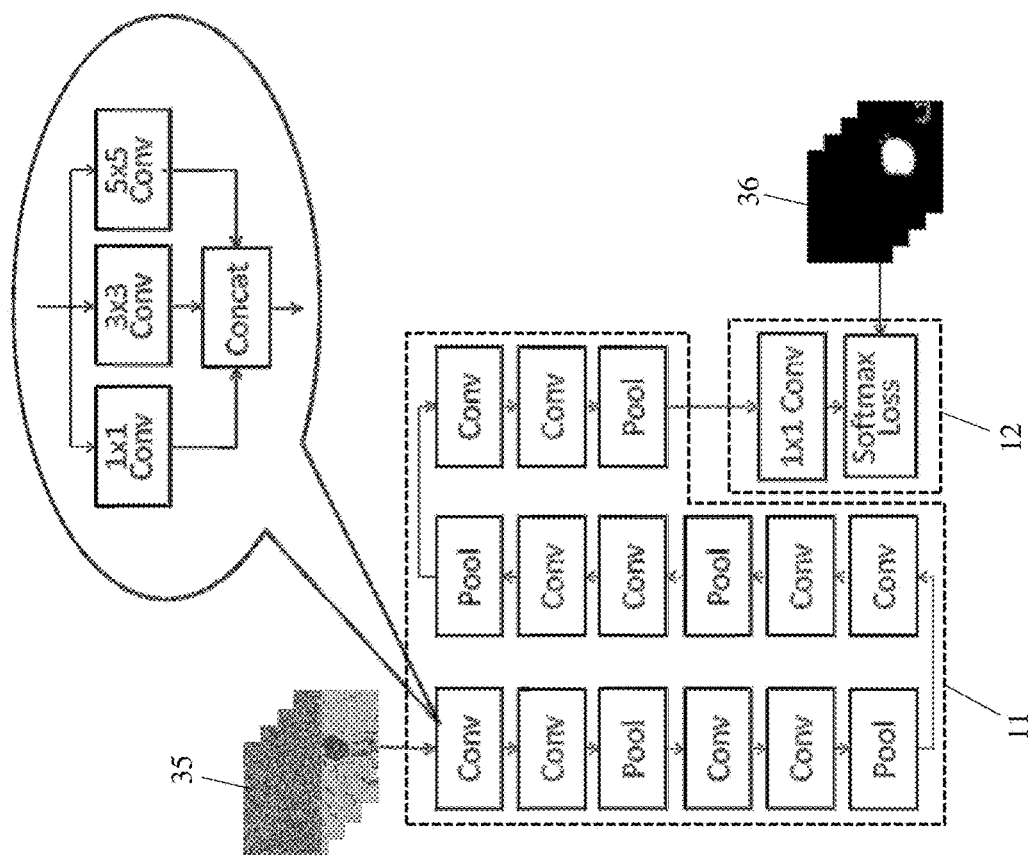
FIGS. 2 and 3 schematically illustrate the network structure and method for training the artificial neural network system of FIG. 1 according to an embodiment of the present invention.
Figure 3:
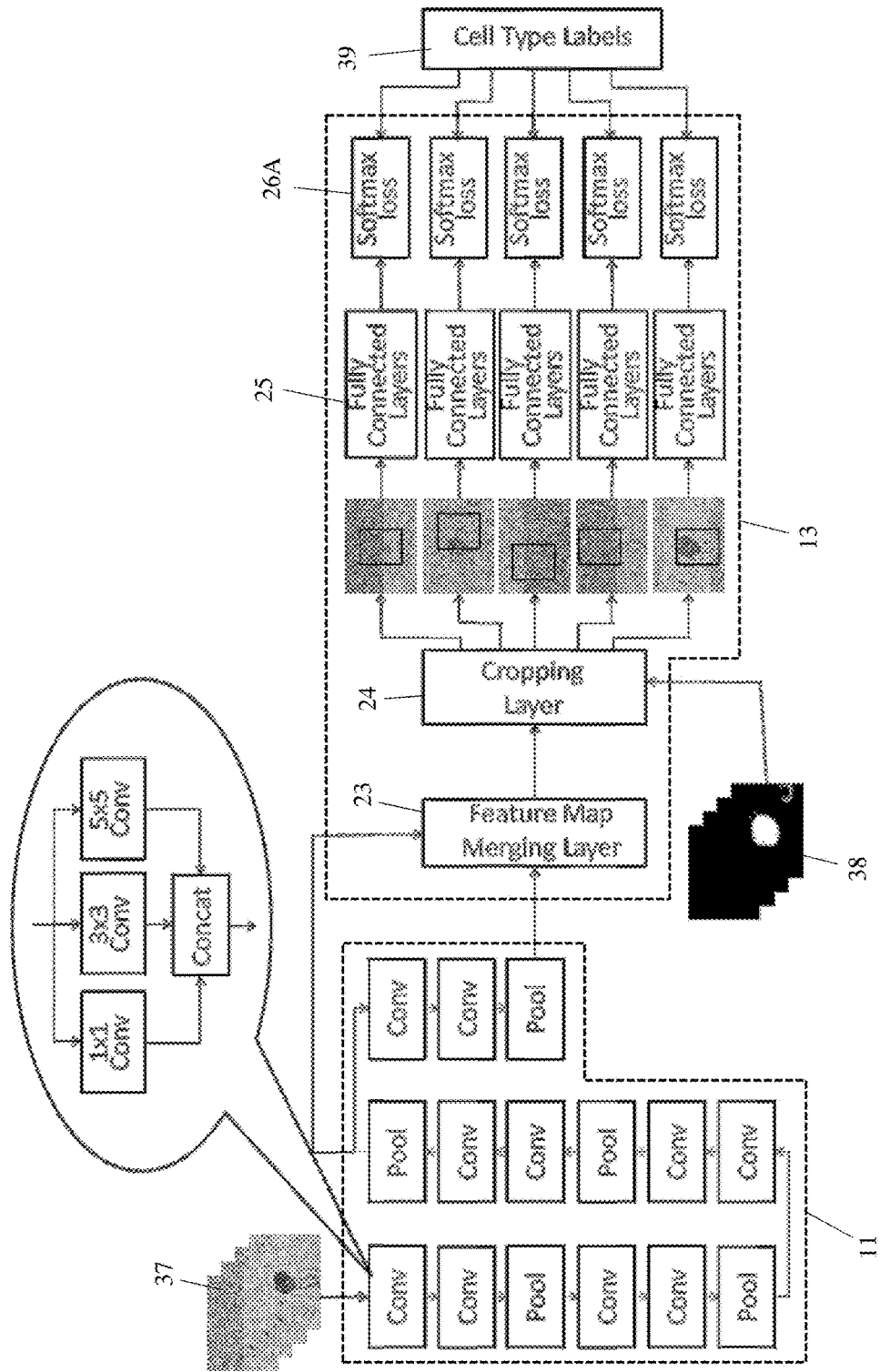

Training of the artificial neural network system of FIG. 1 is done in two stages, as shown in FIGS. 2 and 3.

In the first stage, segmentation training (FIG. 2), only the segmentation portion of the network system, i.e. the feature extraction network 11 and the 1×1 convolutional layer of the first branch network 12, is trained. In other words, the fully connected layers 25 in the second branch network 13 are not trained in the first stage. In this stage, the training data comprises training image patches 35 and corresponding segmentation map patches (label data) 36. The training data may be extracted from whole images and their corresponding segmentation maps. In each training iteration, a training image patch 35 is fed into the feature extraction network 11, and the output of the feature extraction network 11 (from the final pooling layer) is fed into the 1×1 convolutional layer of the first branch network 12. The softmax layer of the first branch network 12 is replaced with a softmax loss layer, which calculates a loss of the softmax of the output of the 1×1 convolutional layer using the label data 36. Based on the loss, the weights of the feature extraction network 11 and the first branch network 12 are updated through backpropagation.

In the second stage, classification training (FIG. 3), trained weights in the convolutional and pooling layers in the feature extraction network 11 remain unchanged, i.e. their values are as those obtained in the segmentation training stage; only the fully connected layers 25 of the second branch network 13 are trained. In this stage, the training data comprises training image patches 37 containing different types of cells, corresponding cell segmentation map patches (segmentation labels) 38, and corresponding cell type labels 39. Each training image 37 (which is typically larger than the input image size of the feature extraction network 11) is divided into multiple image patches matching the input image size of the feature extraction network 11, and the image patches are separately fed into the trained feature extraction network 11. The feature map merging layer 23 combines the feature maps for the multiple image patches, from both the final layer and an intermediate layer of the feature extraction network 11, in the manner described earlier, to generate combined feature maps of the training image 37. The cell segmentation label 38 is fed into the cropping layer 24. For each cell body region of the segmentation label 38, the cropping layer 24 generates multiple cropped patches from the combined feature maps, including one centered patch and multiple shifted patches, in the manner described earlier. The multiple cropped patches are separately fed into the multiple fully connected layers 25. The output of each fully connected layer 25 is fed to a corresponding softmax loss layer 26A (in place of the softmax layer 26) which calculates a loss of the softmax of the output of the fully connected layer 25 using the corresponding cell type label 39. Based on the loss, the weights of the fully connected layers 25 are updated. Note that the multiple fully connected layers 25 are trained independently. The training images used in the second training stage may be the same or different form those used in the first training stage.

To summarize, embodiments of the present invention provide a unified artificial neural network system for cell segmentation and classification which uses a modified VGG network as a common feature extractor and has two branches for segmentation and classification tasks. The network structure has several benefits and advantages compared with other existing network structures. First, unlike some existing network structures that use separate networks for segmentation and classification, the network structure of the present embodiments is based on a single network so that segmentation and classification share the weights in feature extraction. As a result, the network system is more efficient. Second, each convolutional layer uses multiple kernels with different kernel sizes to extract richer features so that subtle difference among classes can be preserved. Third, the feature map merging layer is used for combining feature map patches outputted from the different level of layers of the feature extraction network so that details of the objects are preserved which increases the differentiation of classes. Fourth, shifted or off-center regions of feature maps are used and processed by separate classifiers. The reason for using shifted regions is that the cell center may not be accurately determined, and using off-center regions will help to classify the cells more accurately. Fifth, by using the cell segmentation map as an input to the second branch network, classification is only performed for regions of the image that are identified in the segmentation map as being cell bodies and their vicinities. This helps to avoid performing classification unnecessarily on regions that do not contain cells.

The artificial neural network system described above may be implemented as software, firmware, hardware, or a combination of them, such as a computer system including processors and memories storing computer executable programs, special purpose logic circuitry such as FPGA (field programmable gate array) and ASIC (application specific integrated circuit), etc. Each of the components of the system may be implemented as a computer program module executed by processors. The system that the neural network is implemented on is generally referred to as a data processing system.

It will be apparent to those skilled in the art that various modification and variations can be made in the artificial neural network system and related cell segmentation and classification method of the present invention without departing from the spirit or scope of the invention. Thus, it is intended that the present invention cover modifications and variations that come within the scope of the appended claims and their equivalents.

What is claimed is:

1. An artificial neural network system implemented on a computer for cell segmentation and classification in biological images, comprising:
    a convolutional neural network, including a plurality of convolutional layers and a plurality of pooling layers connected in series, configured to receive an input image patch and generate feature maps at each of the plurality of convolutional layers and pooling layers;
    a first branch network, including at least one convolutional layer, configured to receive feature maps generated by a final pooling layer of the convolutional neural network and generate a cell segmentation map for the input image patch, the cell segmentation map being a binary map including a plurality of cell body regions corresponding to cells within the input image patch; and
    a second branch network, including N fully connected layers in parallel, N being equal to or greater than 1, the second branch network being configured to receive feature maps from the convolutional neural network and receive the cell segmentation map generated by the first branch network, and to calculate a classification for each of the cell body regions in the cell segmentation map.

2. The artificial neural network system of claim 1, wherein the convolutional neural network includes five groups of convolutional layers, each group including two convolutional layers, and a pooling layer after each group of convolutional layers.

3. The artificial neural network system of claim 1, wherein each convolution layer in the convolutional neural network performs a plurality of convolutional operations on a previous convolutional layer using a plurality of kernels of different predefined sizes.

4. The artificial neural network system of claim 1, wherein the first branch network includes:
    a 1×1 convolutional layer configured to receive the feature maps generated by a final pooling layer of the convolutional neural network;
    a softmax layer configured to receive output of the 1×1 convolutional layer and calculate a probability map which represents probabilities of each pixel of the input image patch being one of three classes including cell body, cell boundary, and background; and
    a post-processing module configured to receive the probability map and generate the cell segmentation map.

5. The artificial neural network system of claim 4, wherein the probability map includes a first channel which represents a probability of each pixel of the input image patch being cell body, a second channel which represents a probability of each pixel of the input image patch being cell boundary, and a third channel which represents a probability of each pixel of the input image patch being background, wherein the post-processing module is configured to perform:
    binarizing the first channel into a first binary map, the first binary map including cell body regions representing cell bodies;
    binarizing the second channel into a second binary map;
    performing a skeleton operation on the second binary map to generate a skeleton map having a plurality of skeleton lines;
    growing the cell body regions of the first binary map until they reach positions of surrounding skeleton lines in the skeleton map; and
    after the growing step, performing a convexity defect analysis on the first binary map to identify regions of overlapping cells and to separate overlapping cells into multiple separate cell regions, to obtain the cell segmentation map.

6. The artificial neural network system of claim 1, wherein the second branch network is configured to receive feature maps from a final pooling layer and at least one intermediate pooling layer of the convolutional neural network.

7. The artificial neural network system of claim 1, wherein the second branch network further comprises:
    a feature map merging layer configured to receive final feature maps from the final pooling layer of the convolutional neural network and intermediate feature maps from an intermediate pooling layer of the convolutional neural network, and combine them into combined feature maps;
    a cropping layer configured to crop N feature map patches from the combined feature maps based on the cell segmentation map, the N feature map patches corresponding to a cell body region of the cell segmentation map;
    wherein each of the N fully connected layers operate on a corresponding one of the N feature map patches; and
    wherein the second branch network further comprises N softmax layers each configured to receive output of a corresponding one of the N fully connected layers and calculate a probability vector representing probabilities of the corresponding feature map patch belonging to each of a plurality of predefined cell classes.

8. The artificial neural network system of claim 7, wherein N is greater than 1,
    wherein the N feature map patches cropped by the cropping layer includes one feature map patch centered on the cell body region of the cell segmentation map and N-1 feature map patches shifted in their positions in different directions with respect to a center of the cell body region, and
    wherein the N fully connected layers and the corresponding N softmax layers independently operate on the N feature map patches.

9. The artificial neural network system of claim 8, wherein the second branch network further comprises a voting module configured to determine the classification for the cell body region based on the N probability vectors calculated by the N softmax layers.

10. The artificial neural network system of claim 7, wherein the feature map merging layer is configured to receive multiple final feature maps from the final pooling layer of the convolutional neural network, the multiple final feature maps being separately generated from corresponding multiple input image patches, the multiple input image patches having been formed by dividing a whole biological image, and to recombine the multiple final feature maps together into final feature maps of the whole biological image, the feature map merging layer is further configured to receive multiple intermediate feature maps from the intermediate pooling layer of the convolutional neural network, the multiple intermediate feature maps being separately generated from the multiple input image patches, and to recombine the multiple intermediate feature maps together into intermediate feature maps of the whole biological image, and the feature map merging layer is further configured to combine the final feature maps of the whole biological image and the intermediate feature maps of the whole biological image to form the combined feature maps.

11. The artificial neural network system of claim 10, wherein the first branch network is configured to receive the multiple feature maps which have separately generated from the multiple input image patches, to generate multiple corresponding cell segmentation maps for the multiple input image patches, and to recombine the multiple cell segmentation maps to form a cell segmentation map for the whole biological image.

12. A method for training the artificial neural network of claim 1, comprising:
 (a) providing first stage training data which comprises first training image patches containing cells and corresponding first cell segmentation label data;
 (b) training the convolutional neural network and the at least one convolutional layer of the first branch network using the first stage training data, by feeding the first training image patches to the convolutional neural network and calculating a loss of output of the convolutional layer of the first branch network using the first cell segmentation label data;
 (c) providing second stage training data which comprises second training image patches containing different types of cells, corresponding second cell segmentation label data, and corresponding cell type label data; and
 (d) after step (b), while keeping the trained convolutional neural network unchanged, training each of the N fully connected layers of the second branch network independently using the second stage training data, by feeding the second training image patches to the convolutional neural network, feeding the second cell segmentation label data to the second branch network, and calculating a loss of output of the fully connected layer using the cell type label data.

* * * * *